US006925507B1

(12) United States Patent
Hersent

(10) Patent No.: US 6,925,507 B1
(45) Date of Patent: Aug. 2, 2005

(54) DEVICE AND METHOD FOR PROCESSING A SEQUENCE OF INFORMATION PACKETS

(75) Inventor: Olivier Hersent, Caen (FR)

(73) Assignee: Netcentrex, Caen (FR)

(*) Notice: Subject to any disclaimer, the term of this patent is extended or adjusted under 35 U.S.C. 154(b) by 0 days.

(21) Appl. No.: 09/868,154

(22) PCT Filed: Dec. 10, 1999

(86) PCT No.: PCT/FR99/03099
§ 371 (c)(1),
(2), (4) Date: Sep. 24, 2001

(87) PCT Pub. No.: WO00/36779

PCT Pub. Date: Jun. 22, 2000

(30) Foreign Application Priority Data

Dec. 14, 1998 (FR) .............................. 98 15757

(51) Int. Cl.$^7$ .............................................. G06F 3/00
(52) U.S. Cl. ............................... 710/52; 710/1; 710/29; 709/238; 709/240; 709/242; 370/392; 370/394; 370/395.31
(58) Field of Search ............................... 710/1, 29, 52, 710/100–107, 350; 709/238–244, 224–226; 370/392–400

(56) References Cited

U.S. PATENT DOCUMENTS

| | | | | |
|---|---|---|---|---|
| 5,546,387 A | * | 8/1996 | Larsson et al. | 370/392 |
| 5,835,726 A | | 11/1998 | Shwed et al. | |
| 5,898,689 A | * | 4/1999 | Kumar et al. | 370/232 |
| 6,584,103 B1 | * | 6/2003 | Hanaoka et al. | 370/389 |

FOREIGN PATENT DOCUMENTS

GB    2 323 757    9/1998

OTHER PUBLICATIONS

International Search Report for PCT/FR99/03099, Dec. 10, 1999.
Gray A., "Router Encryption Made Easy—The Hard Way", Data Communications, vol. 26, No. 2, Feb. 1, 1997, pp. 36, 38.
Bruno L., "Security Data Communications", vol. 27, No. 1, Jan. 1, 1998, pp. 88, 90.
Makris J., "Locking Down Intranets from Afar—For Less", Data Communications, vol. 27, No. 11, Aug. 1, 1998, pp. 25/26.
Heywood P., Product Leaders Filters Without Fuss, Data Communications, vol. 27, No. 8, May 21, 1998, pp. 29/30.
Bauspiess, F. et al., "Requirements for Cryptographic Hash Functions", Computers & Security International Journal Devoted to the Study of Technical and Financial Aspects of Computer Security, Oxford, Great–Britain, vol. 11, No. 5, Sep. 1, 1992, pp. 427–429.

* cited by examiner

Primary Examiner—Jeffrey Gaffin
Assistant Examiner—Mike Nguyen
(74) Attorney, Agent, or Firm—Gottlieb, Rackman & Reisman, P.C.

(57) ABSTRACT

The packets of the sequence are stowed away in a packets memory organized as a stack, in association with respective processing labels. The processing label associated with each packet extracted from the packets memory is examined so as to activate a processing module selected as a function of the label received. The activated module performs an elementary processing of the packet extracted. The elementary processing performed by at least one of the processing modules comprises associating the extracted packet with a label modified in accordance with a labels translation table, the processed packet subsequently being stowed away again in the packets memory in association with the modified label.

8 Claims, 3 Drawing Sheets

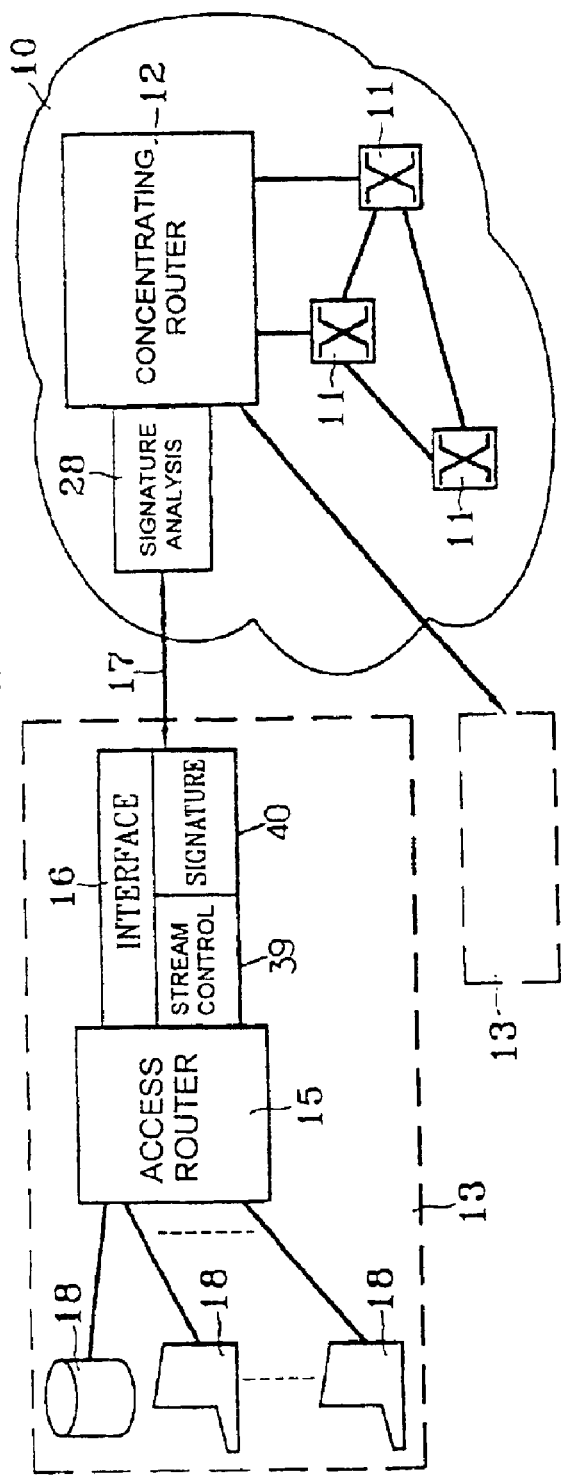
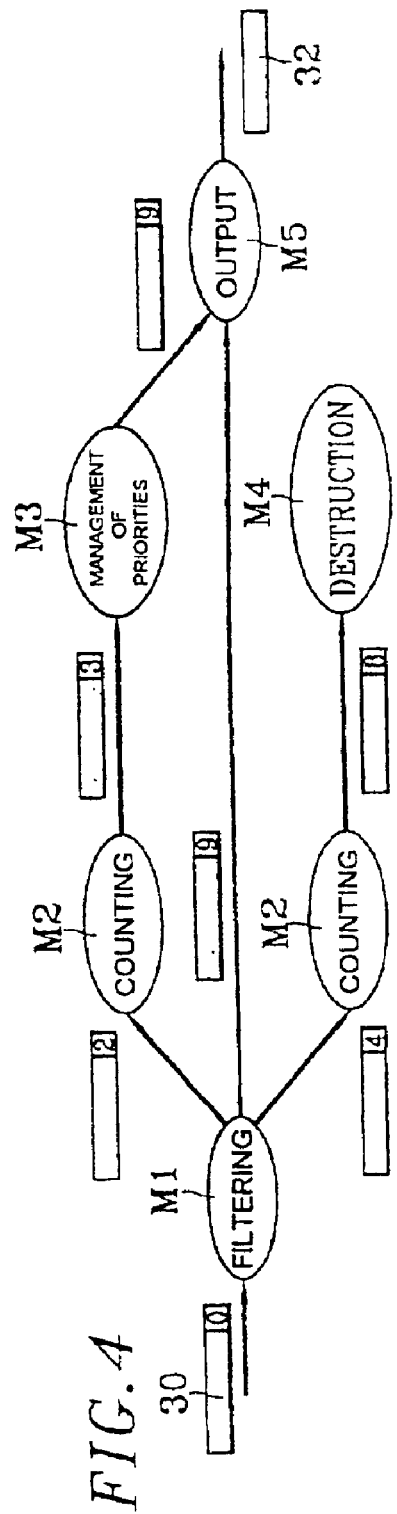

DEVICE AND METHOD FOR PROCESSING A SEQUENCE OF INFORMATION PACKETS

The present invention relates to packet based transmission networks. It applies in particular, but not exclusively, to networks operating according to the Internet protocol (IP).

The invention can be implemented at the level of the outside interfaces of routers of the network, so as to perform analyses and processing of the data streams travelling through these interfaces.

Here, the expression "police" functions designates various processing or control operations performed at the level of such an interface on data streams which pass through it. By way of nonlimiting examples, mention may be made of the counting of the packets exchanged between a given source address and a given destination address, the allocating of priorities to certain packets, address translations, the selective destruction of certain packets, etc.

These police functions may be included within a contractual framework between a subscriber and a manager of the network. Such may for example be the case with functions relating to flow control, to authorization for access to certain sites linked to the network, to the implementing of reservation protocols such as RSVP, etc. They may also be included within the framework of the internal organization of a public or private network, for example to control certain accesses.

Current routers offer a set of configuration commands making it possible to apply such police functions. Thus, a filter relating to certain fields of the header of the packets is defined so as to identify the stream or streams concerned, the filter being associated with a particular function operated on the corresponding packets. These filters, or "access list", exhibit certain inflexibilities. Thus, it is not possible to string two filters together, one specifying a sort on the packets selected by the first. These filters are constructed on a sequential model: the first filter which is suitable for a given packet is adopted with the exclusion of the following filters which might also be suitable. It is therefore impossible to apply several rules and associated processing operations to one and the same stream (for example to count all the packets transmitted according to the TCP protocol on a port x and to count all the TCP streams heading for a given server, including those traveling toward the port x).

To sidestep certain of these limitations, commands performing several joint actions have been defined. These solutions afford only relative flexibility and appreciably complicate the language for configuring the routers. A homogeneous framework for managing the future extensions of the police functions to be undertaken is also lacking.

An aim of the present invention is to propose a mode of processing sequences of information packets which offers high flexibility of configuration without significantly increasing the complexity of the configuration interface.

The invention thus proposes a device for processing a sequence of information packets, comprising a packets memory, organized as a stack, in which the packets of the sequence are stowed away in association with respective processing labels, an assembly of processing modules, and supervisory means receiving the processing label associated with each packet extracted from the packets memory and activating one of the processing modules selected as a function of the label received, the activated module undertaking an elementary processing of the extracted packet. The elementary processing undertaken by at least one of the processing modules comprises the associating of the extracted packet with a label modified in accordance with a labels translation table, the processed packet subsequently being stowed away again in the packets memory in association with the modified label The device makes it possible to string together police functions according to an arbitrary graph of elementary processing operations acting on data streams identified by the processing labels. This affords a flexible framework for managing the configuration of the interface and any protocol extensions.

The performance of the device is independent of the number of strings of elementary processing operations which may be performed on the streams traveling through the interface, and proportional to the more complex of these strings. On the other hand, the technique used consumes more memory than a conventional sequential implementation.

Another aspect of the present invention concerns a method of processing a sequence of information packets, in which the packets of the sequence are stowed away in a packets memory organized as a stack, in association with respective processing labels, the processing label associated with each packet extracted from the packets memory is examined so as to activate a processing module selected as a function of the label received from among an assembly of processing modules, the activated module undertaking an elementary processing of the packet extracted. The elementary processing undertaken by at least one of the processing modules comprises the associating of the extracted packet with a label modified in accordance with a labels translation table, the processed packet subsequently being stowed away again in the packets memory in association with the modified label.

BRIEF DESCRIPTION OF THE DRAWINGS

Other features and advantages of the present invention will become apparent in the following description of non-limiting exemplary embodiments, with reference to the appended drawings, in which:

FIG. 1 is a diagram of a network where the invention may be implemented;

FIG. 4 is a graph of elementary processing operations undertaken by the device of FIG. 3.

DESCRIPTION OF PREFERRED EMBODIMENTS

Figure 2:
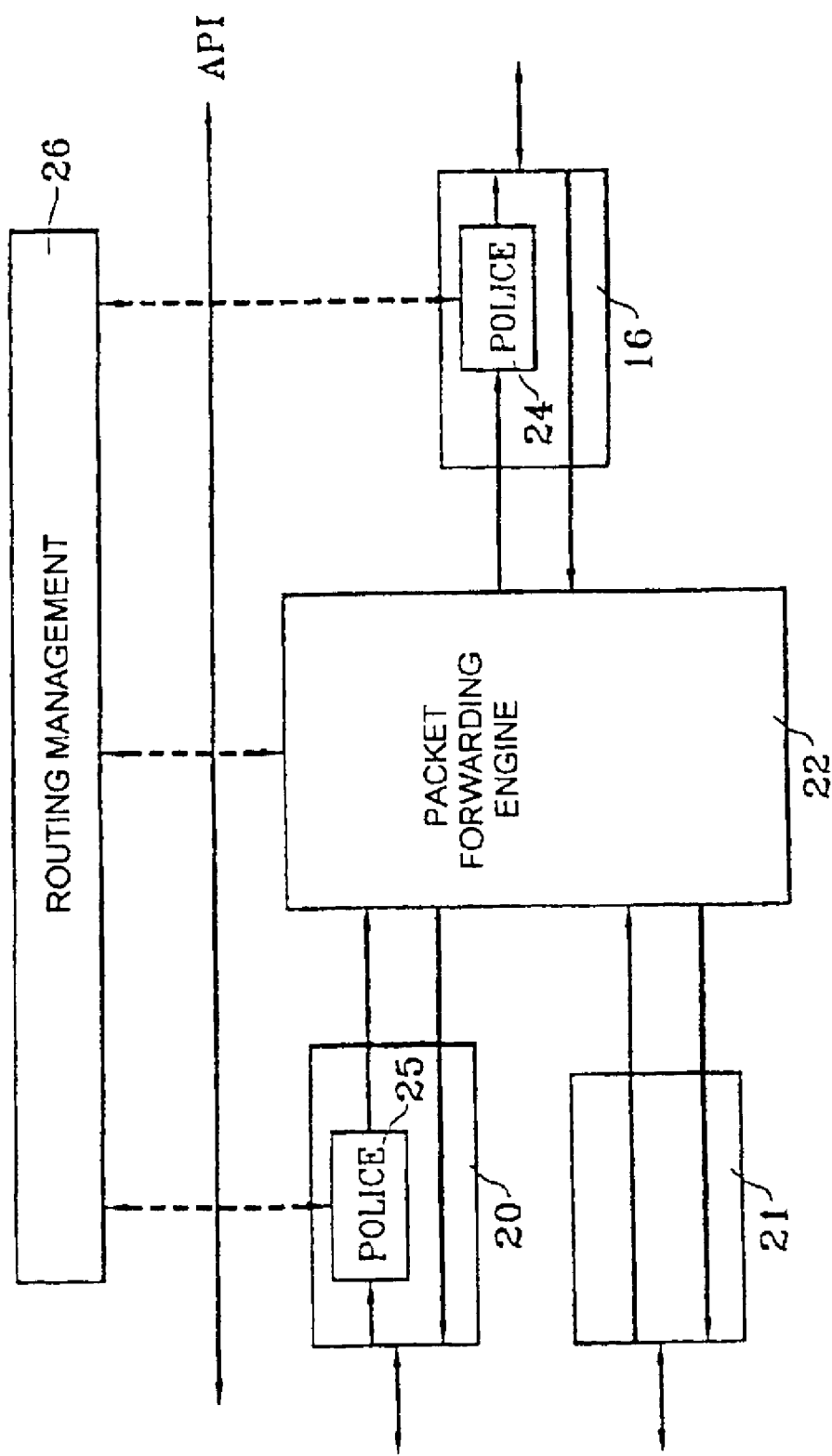
FIG. 2 is a schematic diagram of an access router of a private installation of this network.

FIG. 1 shows a wide area shared network (WAN) comprising a certain number of interconnected routers and switches 11, 12. The case where the shared network 10 operates according to the IP protocol is considered here. A certain number of the routers are concentrating routers 12 to which private installations 13 are linked.

A private subscriber installation 13 is typically linked to the shared network 10 by means of an access router 15, one of whose interfaces 16 is linked to a line 17 for transmission from and to the concentrating router 12. The access router 15 can be linked to other routers of the private installation 13 or to servers or terminals 18 of this installation, by means of other interfaces, which are not represented in FIG. 1.

FIG. 2 shows an exemplary architecture of the access router 15. The outside interface 16, and also the interfaces 20, 21 with the remainder of the private installation 13, are linked to the core of the router consisting of a packet forwarding engine 22. The forwarding engine 22 forwards the packets from one interface to another on the basis of the address fields and port fields contained in the headers of the packets in accordance with the IP protocol and with any extensions thereof (TCP, UDP, etc.), by referring to routing tables.

Certain of the interfaces of the access router 15 are provided, in just one or in both directions of transmission, with processing devices, or stream processors, 24, 25 undertaking police functions. In the illustrative example of FIG. 2, the device 24 is fitted to the outside interface 16 in the outgoing direction, and the device 25 is fitted to another interface 20 in the incoming direction.

The access router is supervised by a management unit 26 which can consist of a microcomputer or a work station which executes routing software serving in particular to configure the routing table of the forwarding engine 22 and the stream processors 24, 25 and to exchange control or protocol information with them. These commands and exchanges are effected by way of an appropriate software programming interface (API).

Most of the existing packet routing and forwarding software is readily available in the Unix environment, but its performance is customarily limited on account of the frequent interruptions of the operating system. It is much faster to use a real time operating system such as VxWorks, but this complicates the implementation of the routing software.

The role of the stream processors 24, 25 is to assist the non-real time operating system (such as Unix), on the basis of which the management unit 26 functions, in the complex tasks for manipulating the streams which require real time performance (forwarding, filtering, enciphering, etc.). These processors implement a certain number of tools for manipulating the streams which may be linked dynamically according to any combination so as to perform the task required. This configuration can be achieved through the Unix operating system by calling the API functions, thereby greatly facilitating the setting up of new functionalities by the programmer.

As illustrated diagrammatically by FIG. 1, one of the tasks performed by the stream processor 24 of the outside interface 16 of the access router 15 consists in transmitting each packet to the concentrating router 12 while appending a digital signature (block 40) thereto. This signature attests that the packets in question have been subjected to the other stream control operations (block 39) performed by the processor 24.

The corresponding interface 28 of the concentrating router 12 comprises a module for analyzing the packets received on the line 17 so as to make sure that the signature is present.

This signature technique advantageously makes it possible to decentralize the stream control operations necessary for the contractual relations between the manager of the concentrating router 12, which provides the service of attachment to the shared network 10, and the subscribers whose installations 13 are linked to this concentrating router 12. In the conventional embodiments, these stream control operations are performed at the level of the concentrating router. This results in considerable complexity of the concentrating router when it is attached to a fairly large number of private installations, and a lack of flexibility for the subscribers when modifications are required.

By performing these stream control operations at the level of the access routers 15, great flexibility is afforded in this regard. The signing of the packets then guarantees to the service provider that the line 17 does not send him valid packets which depart from the contractual framework with the subscriber. If such a packet were to appear, the interface 28 of the concentrating router 12 would simply eliminate it after having noted the absence of the appropriate signature.

Various conventional processes may be used to construct and analyze the signature of the packets, on the basis of a secret shared between the routers 12 and 15. The signature can in particular have the form of a code word added to the content of the packet, and calculated on the basis of all or part of this content and of a secret key, the calculation being performed with the aid of a function which is extremely difficult to invert in order to recover the secret key. It is thus possible to use a technique of hashing the content of the packet, or of just a part of this content, for example an MD5 hashing (see R. Rivest, RFC 1231, "The MD5 Message Digest Algorithm").

It is also possible to use an enciphering process to form the signature of the packets. The content of the packet is then enciphered with the aid of a private key, the interface 28 of the concentrating router undertaking the corresponding deciphering with the aid of a public or private key. The unenciphered packets, or those enciphered by means of a wrong key are then destroyed at the level of the interface 28.

As an option, provision may be made for the interface 28 of the concentrating router to also sign the packets which it transmits on the line 17, and for the interface 16 of the access router to verify this signature so as to make sure that the packets received are valid.

Figure 3:
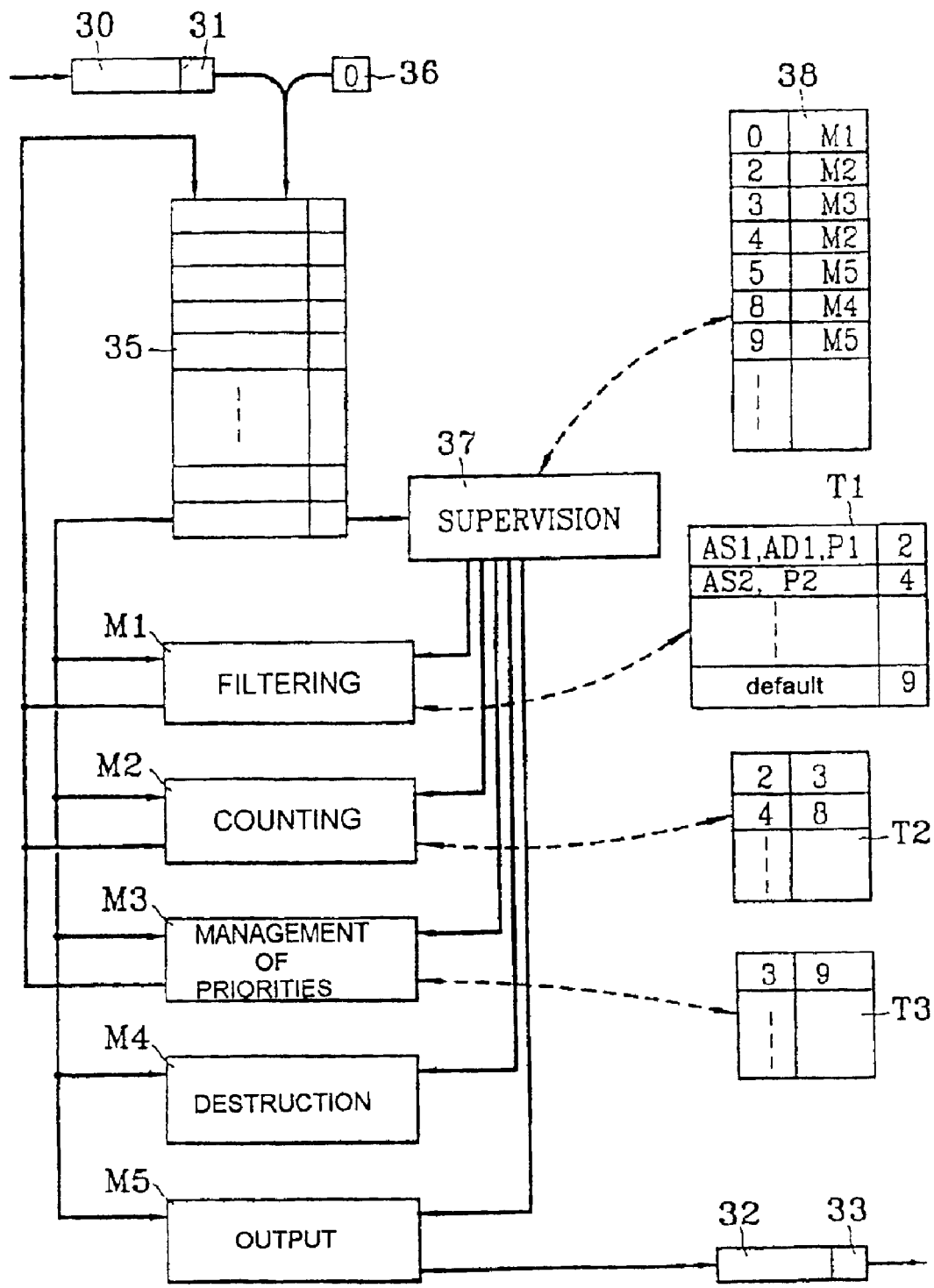
FIG. 3 is a schematic diagram of a stream processing device forming part of an interface of the router of FIG. 2.

FIG. 3 shows the organization of a stream processor 24 or 25 of an interface of the access router 15.

The stream processor receives a sequence of incoming packets 30 each comprising a header 31 in accordance with the IP protocol, and delivers a sequence of outgoing packets 32 having a header 33 after having performed certain elementary processing operations whose nature depends on the data streams concerned.

The incoming packets 30 are stowed away in a packets memory 35 organized as a first in-first out (FIFO) stack. Each packet is fed to the memory 35 with a processing label 36. The processing label initially has a specified value (0 in the example represented) for the incoming packets 30.

The stream processor is supervised by a unit 37 which cooperates with a table 38 making it possible to associate a particular processing module with each value of the processing label. In the simplified example represented in FIG. 3, the stream processor comprises an assembly of five processing modules M1–M5 effecting elementary processing operations of different kind.

After the execution of an elementary processing operation, the supervisory unit 37 consults the packets memory 35. If the latter is not empty, a packet is extracted therefrom according to the FIFO organization. The supervisory unit 37 consults the table 38 to determine which processing module corresponds to the label of this packet. The unit 37 then activates the module in question so that it performs the corresponding elementary processing operation. In certain cases, this elementary processing operation may entail a modification of the content of the packet, in particular its header.

It will be understood that the "extraction" of the packet, to which reference is made, is an extraction in the logical sense from the FIFO memory. The packet is not necessarily removed from the memory. The addresses of the packets in the memory 35 can be managed in a conventional manner by means of pointers so as to comply with the FIFO organization. The activated processing module can be furnished simply with the address of the current packet so as to perform the required reads, analyses, modifications or deletions as appropriate.

The first processing module M1, associated with the initial label 0, is a filtering module which analyzes the address field and/or protocol definition field and/or port field of the IP header of the packets. With the help of an association table T1, the filtering module M1 delivers a second processing label which identifies a string of elementary processing operations which will subsequently have to be performed on the packet. After having determined the second processing label for the packet extracted from the memory 35, the filtering module M1 stows away the packet in the memory 35 again, with the second processing label. The next elementary processing operation will then be executed when the packet is again extracted from the memory.

The module M2 is a module for counting the packets relating to certain streams. In the case of the association table 38 represented in FIG. 3, this module M2 is called for the processing labels 2 and 4. When it processes a packet, the module M2 increments a counter with the number of bytes of the packet, or else with the value 1 in the case of a packets counter. The counter can be made secure, in particular if it serves for the billing of the subscriber by the manager of the network 10. In the case of a secure counter, requests are regularly made to the access provider to obtain transmission credits, the relevant packets being destroyed if the credit is used up.

The module M3 of FIG. 3 is a priorities management module. In the case of the association table 38 represented in FIG. 3, this module M3 is called for the processing label 3. The module M3 operates on the TOS ("Type of Service") field of the IP header of the packets. The TOS is used in the network to manage forwarding priorities so as to provide a certain quality of service on certain links. The TOS field can be changed according to prerecorded tables. These tables can be defined under the control of the access provider so as to prevent packets being inappropriately transmitted with a high priority, which might disturb the network.

The elementary processing operation performed last on a packet of the memory 35 is either its destruction (module M4 activated by the label 8), or its resubmission to the output of the stream processor (module M5 activated by the label 5 or 9). The module M4 can be used to destroy packets having a certain destination and/or a certain origin.

The modules M2 and M3, which do not terminate the processing operations to be undertaken in respect of a packet (except in the case of destruction), each operate with a label translation table T2, T3. This translation table designates, for the processing label extracted from the memory 35 with the current packet, another processing label designating the next elementary processing operation to be undertaken. The elementary processing operation undertaken by this module M2 or M3 terminates with the associating of the packet with this other processing label and the reinjecting of the packet thus processed into the memory 35.

In this way, highly varied combinations of processing operations can be performed on the various data streams passing through the processor.

FIG. 4 shows a simplified example corresponding to the tables 38, T1–T3 represented in FIG. 3. The incoming packet 30, associated with the first label 0, is firstly subjected to the filtering effected by the module M1.

In the particular case considered, the stream processor 24 counts the packets transmitted from a source address AS1 to a destination address AD1 and a port P1, and modifies the TOS field of these packets before delivering them on the line 17, this corresponding to the upper branch of the graph of FIG. 4. Moreover, the stream processor 24 counts the packets emanating from a source address AS2 heading for a port P2 before destroying them, this corresponding to the lower branch of FIG. 4. The other packets are simply delivered to the line 17. The default value (9) of the processing label returned by the module M1 therefore simply designates the output module M5. If the module M1 detects in the packet extracted from the memory 35 the combination AS1, AD1, P1 in the relevant address and port fields, it returns the packet with the processing label 2. If the values AS2, P2 are detected in the address and port fields, it is the label 4 which is returned with the packet.

These labels 2 and 4 both correspond to the counting module M2. The label will also designate for this module the memory address of the counter which has to be incremented. The table T2 with which the module M2 operates will make it possible at the end of processing to perform the return to the next module to be activated (M3 designated by the label 3 for the packets whose TOS has to be changed, M4 designated by the label 8 for the packets to be destroyed).

The module M3 receives packets with the processing label 3, and returns. them with the label 9 after having made the required modification of the TOS field.

From this simplified example it can be seen that the stream processor makes it possible, through the identification of a stream by the filtering module M1, to perform various combinations of elementary processing operations in a relatively simple and fast manner.

A main advantage of this way of proceeding is the flexibility of the operations for configuring the stream processor. The tables 38, T1–T3 which define any graph of elementary processing operations, such as the one represented in FIG. 4, can be constructed relatively simply and with a small real time constraint by means of the management unit 36 through the API. The same holds in respect of the information enabling the modules M1–M5 to perform their elementary processing operations (description of the counts to be performed by the module M2, way of changing the TOS fields by the module M3, etc.).

In practice, the stream processor may comprise various processing modules other than those represented by way of example in FIGS. 3 and 4, according to the requirements of each particular installation (for example, module for managing the output queues, address translation module, etc.).

The function of signing the packets transmitted, which was described earlier, can form part of the elementary processing undertaken by the output module M5. In a typical embodiment of the access router, the stream processor 24 will be included in an application specific integrated circuit (ASIC) organized around a microcontroller core. This embodiment allows there to be no physical access between the stream control modules 39 (at least those which pertain to the relations between the subscriber and the manager of the network 10) and the module M5 which is responsible for signing the packets, corresponding to the block 40 of FIG. 1. This improves the security of the link from the viewpoint of the manager of the network.

What is claimed is:

1. A device for processing a sequence of information packets, comprising:

a packets memory organized as a stack, means for stowing away the packets of the sequence in association with respective processing labels, a plurality of processing modules, at least one labels translation table, means for extracting packets from the packets memory, and supervisory means for receiving the processing label associated with each packet extracted from the packets memory and activating one of the processing modules selected as a function of the label received, the activated module being arranged to perform an elementary processing of the extracted packet, whereby the elementary processing performed by at least one of the processing modules comprises associating the extracted packet with a label modified in accordance with a labels translation table, the processed packet subsequently being stowed away again in the packets memory in association with the modified label.

2. A device according to claim 1, wherein a first processing label is associated initially with each packet of the sequence, wherein the supervisory means are arranged to activate a filtering module forming part of the plurality of processing modules in response to the receipt of the first processing label, and wherein the elementary processing performed by the filtering module comprises analyzing a header of the packet extracted and associating the packet with a second processing label dependent on a result of the analysis.

3. A device according to claim 1, wherein the plurality of processing modules comprises an output module for transmitting the extracted packet to an output of the device, with a signature based on a secret shared with a concentrating router of a telecommunication network, authenticating that the packet has been subjected to the processing operations performed by the device.

4. A method of processing a sequence of information packets, comprising the steps of:

stowing away the packets of the sequence in a packets memory organized as a stack, in association with respective processing labels, and examining the processing label associated with a packet extracted from the packets memory so as to activate a processing module selected as a function of the label received from among an assembly a plurality of processing modules, whereby the activated module performs an elementary processing of the packet extracted, wherein the elementary processing performed by at least one of the processing modules comprises associating the extracted packet with a label modified in accordance with a labels translation table, the processed packet subsequently being stowed away again in the packets memory in association with the modified label.

5. A method according to claim 4, wherein, after having been subjected to various elementary processing operations, each packet is delivered with a signature based on a secret shared with a concentrating router of a telecommunication network, authenticating that the packet has been subjected to said elementary processing operations.

6. A device for processing a sequence of information packets, comprising:

a packets memory organized as a stack, means for stowing away the packets of the sequence in association with respective processing labels, a plurality of processing modules, at least one labels translation table, means for extracting packets from the packets memory, and supervisory means for receiving the processing label associated with each packet extracted from the packets memory and activating one of the processing modules selected as a function of the label received, the activated module being arranged to perform an elementary processing of the extracted packet, wherein the elementary processing performed by at least one of the processing modules comprises associating the extracted packet with a label modified in accordance with a labels translation table, the processed packet subsequently being stowed away again in the packets memory in association with the modified label, wherein a first processing label is associated initially with each packet of the sequence, wherein the supervisory means are arranged to activate a filtering module forming part of the plurality of processing modules in response to the receipt of the first processing label, and wherein the elementary processing performed by the filtering module comprises analyzing a header of the packet extracted and associating the packet with a second processing label dependent on a result of the analysis.

7. A device according to claim 6, wherein the plurality of processing modules comprises an output module for transmitting the extracted packet to an output of the device, with a signature based on a secret shared with a concentrating router of a telecommunication network, authenticating that the packet has been subjected to the processing operations performed by the device.

8. A method of processing a sequence of information packets, comprising the steps of:

stowing away the packets of the sequence in a packets memory organized as a stack, in association with respective processing labels, and examining the processing label associated with a packet extracted from the packets memory so as to activate a processing module selected as a function of the label received from among an assembly a plurality of processing modules, whereby the activated module performs an elementary processing of the packet extracted, wherein the elementary processing performed by at least one of the processing modules comprises associating the extracted packet with a label modified in accordance with a labels translation table, the processed packet subsequently being stowed away again in the packets memory in association with the modified label, and wherein, after having been subjected to various elementary processing operations, each packet is delivered with a signature based on a secret shared with a concentrating router of a telecommunication network, authenticating that the packet has been subjected to said elementary processing operations.

* * * * *